(12) United States Patent
Godin et al.

(10) Patent No.: US 7,065,053 B2
(45) Date of Patent: Jun. 20, 2006

(54) METHOD, SYSTEM AND AGENT FOR THIRD GENERATION PARTNERSHIP PROJECT (3GPP) TECHNICAL SPECIFICATION (TS) DOCUMENT NUMBER EXCHANGE

(75) Inventors: Andre Godin, Laval (CA); Nicolas Gosselin, Blainville (CA); David McAleer, Beaconsfield (CA); Edwin Tse, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 978 days.

(21) Appl. No.: 10/024,234

(22) Filed: Dec. 21, 2001

(65) Prior Publication Data

US 2002/0176423 A1 Nov. 28, 2002

Related U.S. Application Data

(60) Provisional application No. 60/293,802, filed on May 25, 2001.

(51) Int. Cl.
*H04J 1/16* (2006.01)

(52) U.S. Cl. .................. 370/252; 370/467; 370/401

(58) Field of Classification Search ................ 370/466, 370/467, 328, 329, 278, 400, 401, 252; 709/228, 709/230, 227; 455/466; 379/93.24; 342/457; 702/122
See application file for complete search history.

(56) References Cited

U.S. PATENT DOCUMENTS 5,627,766 A * 5/1997 Beaven .................... 702/122
6,678,361 B1 * 1/2004 Rooke et al. ............. 379/93.24
6,934,756 B1 * 8/2005 Maes ......................... 709/227
6,952,181 B1 * 10/2005 Karr et al. .................. 342/457

FOREIGN PATENT DOCUMENTS

EP 0 279 232 8/1988

OTHER PUBLICATIONS

ETSI: ETSI TS 132 111-3 v3.5.0, "Universal Mobile Telecommunications System (UMTS); Telecommunication Management; Fault Management; Part 3: Alarm Integration Reference Point: CORBA solution set version 1:1 (3GPP TS 32.111-3 version 3.5.0. Release 1999)", Jun. 2001, XP002208685, pp. 1-26.

(Continued)

*Primary Examiner*—John Pezzlo

(74) *Attorney, Agent, or Firm*—Alex Nicolaescu, Ericsson Canada,Inc.

(57) ABSTRACT

A method, system and agent for exchanging the Third Generation Partnership Project (3GPP) Technical Specification document number a first node uses, with a second node of the network, so that subsequent communications can be properly carried between the nodes. The first node may be an agent and the second node may be a manager of a management system. The manager sends a GetXXXIRPVersion request message, a GetNotificationCategories request message, or a GetNetworkResourceSchemeId request message, to which the agent responds with an abridged version of the 3GPP TS document number the agent uses in this type of communications, so that the manager is informed of the protocol employed by the agent and can expect communications of the type indicated by the agent.

26 Claims, 3 Drawing Sheets

OTHER PUBLICATIONS

ETSI: ETSI TS 132 111-3 v3.4.0, "Universal Mobile Telecommunications System (UMTS); Telecommunication Management; Fault Management; Part 3: Alarm Integration Reference Point: CORBA solution set version 1:1 (3GPP TS 32.111-3 version 3.4.0. Release 1999)", Mar. 2001, XP002208686, pp. 1-24.

PCT International Search Report for PCT/CA02/00723 dated Jan. 24, 2003 from the European Patent Office.

* cited by examiner

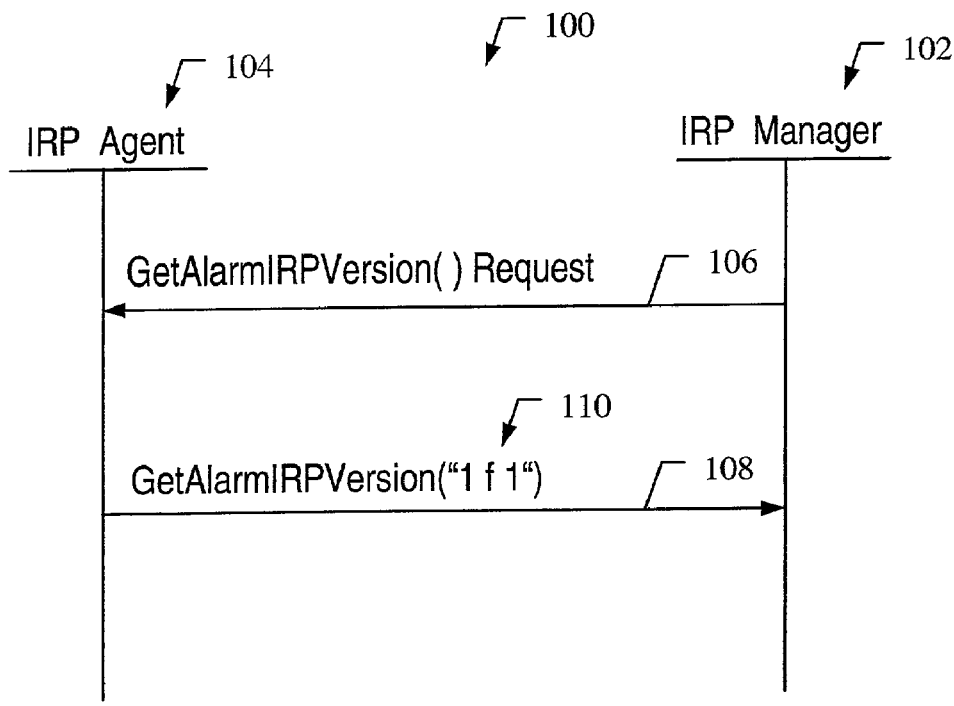
*Figure 1.a (Prior Art)*
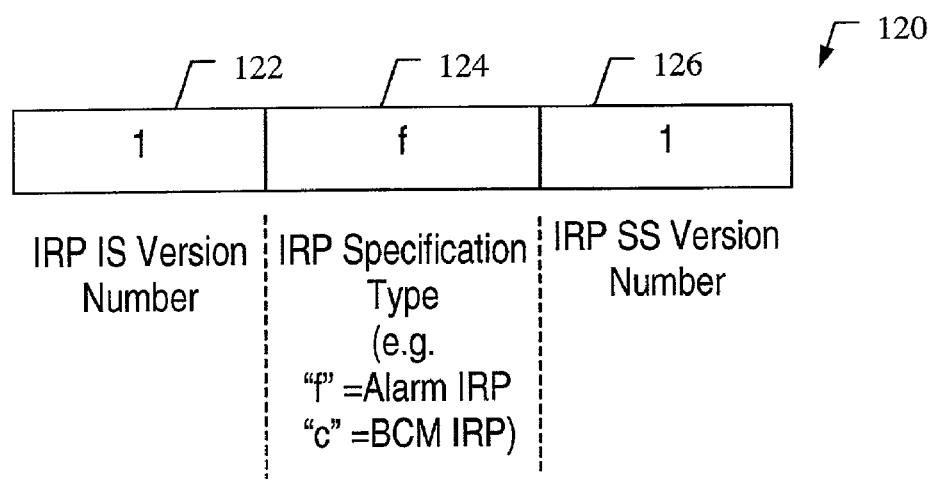
*Figure 1.b (Prior Art)*

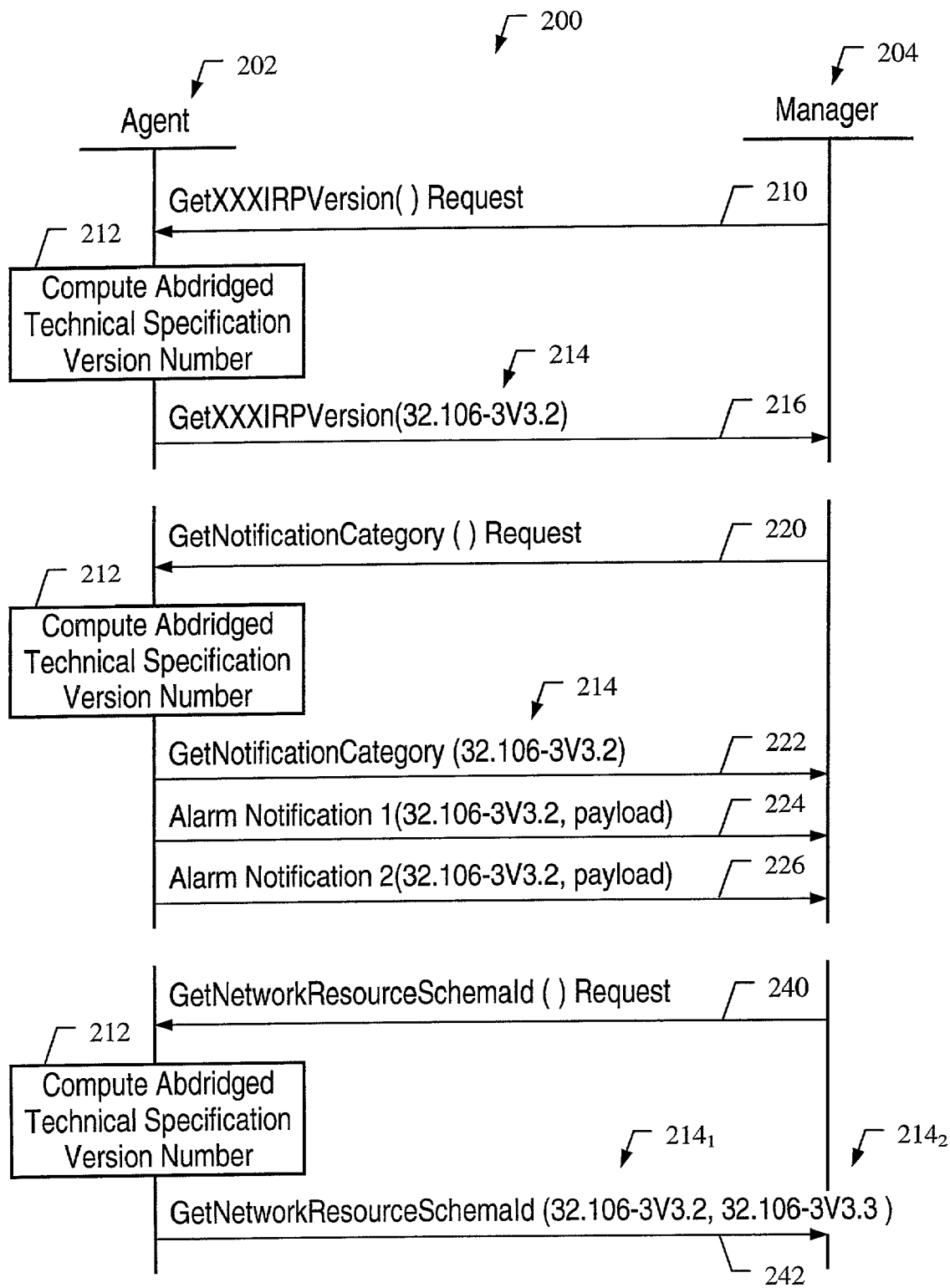
Figure 2.a

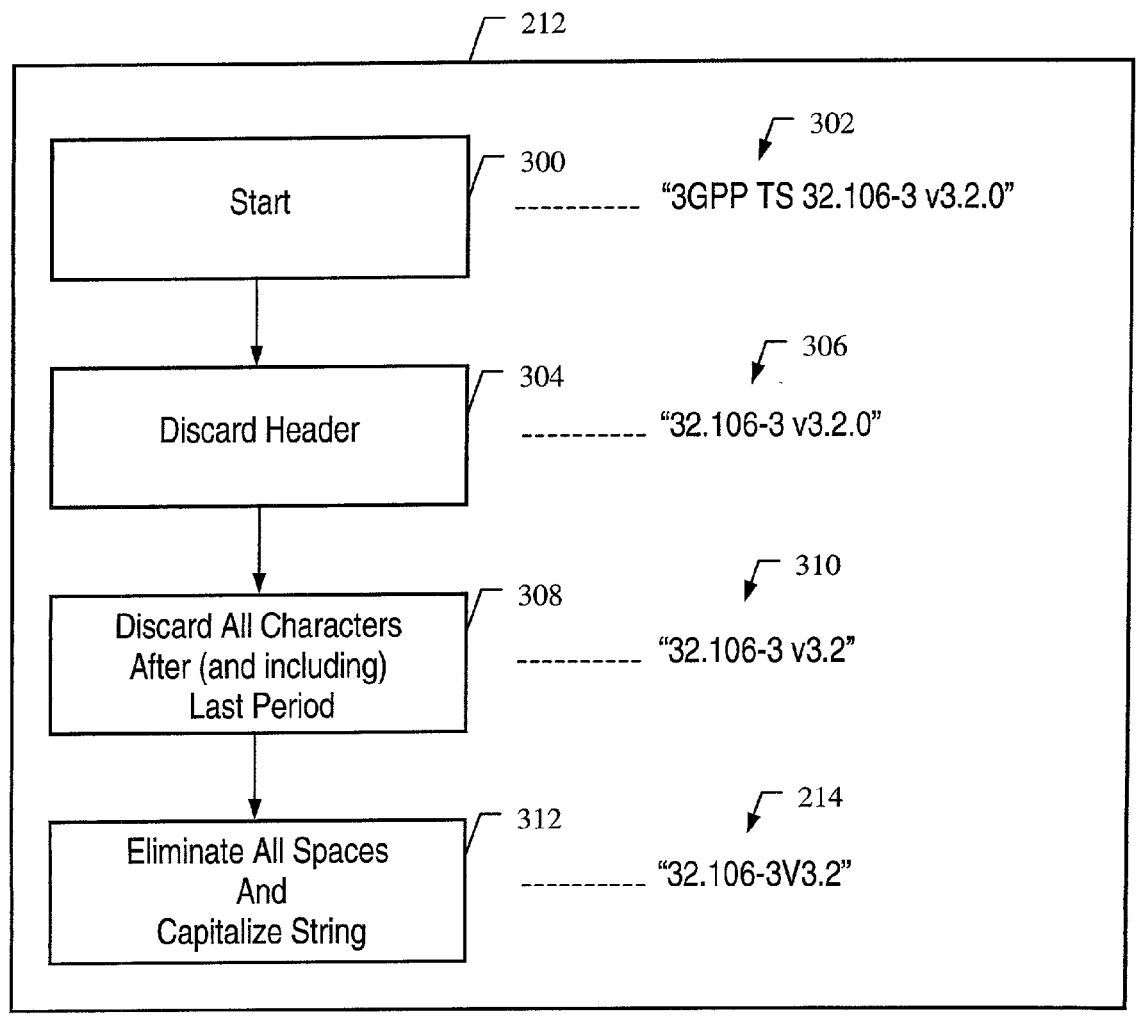
*Figure 2.b*

METHOD, SYSTEM AND AGENT FOR THIRD GENERATION PARTNERSHIP PROJECT (3GPP) TECHNICAL SPECIFICATION (TS) DOCUMENT NUMBER EXCHANGE

PRIORITY UNDER 35 U.S.C. S 119(e) & 37 CFR S 1.78

This nonprovisional patent application claims priority based upon the prior U.S. provisional patent application entitled "Method of IRP Versioning", application No. 60/293,802, filed on May 25, 2001, in the names of Andre Godin, Nicolas Gosselin, David McAleer and Edwin Tse.

BACKGROUND OF THE INVENTION

1. Field of the Invention

The present invention relates generally to the field of communications networks and, more specifically, to standard identification communications between telecommunications nodes.

2. Description of the Related Art

A communications network typically comprises a plurality of communications nodes, which "speak" to each other by exchanging various classes of messages, representing commands, data, requests, replies, notifications or others, according to the technology and protocol used within each such network. For meaningful communications to take place between communications nodes, the message syntax and semantics must be understood and agreed among the communicating nodes. The document that specifies the syntax and semantics of the messages exchanged between nodes is sometimes called the interface specification, technical specification or protocol. At the operation level, the Integration Reference Point (IRP) is one of such protocols, through which the communications messages are exchanged between nodes in a management system. There are many types of IRP specifications or protocols, such as for example for fault management (Alarm IRP) and for configuration management (Basic Configuration IRP).

In 3$^{rd}$ Generation Partnership Project (3GPP) based communications environments, the IRP specifications define and control network management-related communications between an Element Management-Network Management node (EM-NM) and the controlled Network Elements nodes (NEs).

Various IRP specifications exist for defining communications in a plurality of network management sub-fields. In the fault/alarm management field, one of the most basic needs is to support alarm surveillance. Product specific applications use the Alarm IRP specification to be able to forward alarm notifications from various NEs and to a Fault Monitoring (FM) application. Another IRP specification is the Basic Configuration Management IRP specification that defines and controls the management of topology and logical resources in the managed network (retrieval of the configuration and status of the network elements). Finally, the Performance Monitoring (PM) is achieved according to the Performance Data IRP specification.

Reference is now made to FIG. 1.a (Prior Art), which shows a nodal operation and signal flow diagram of a typical prior art scenario for exchanging IRP specification names between two communications nodes. In FIG. 1.a, a management system 100 comprises an IRP Manager 102 that communicates with an IRP Agent 104. For this purpose, the Manager 102 must first know the supported IRP specification and version used and supported by the IRP Agent 104. Each type of IRP specification defines a mandatory method called getXXXIRPVersion( ), wherein "XXX" refers to the given type of IRP specification. For example, the method getAlarmIRPVersion( ) is used for deducting the Alarm IRP specification supported by a given node. With reference to FIG. 1.a (Prior Art), prior to any further communications, the IRP Manager 102 transmits a getXXXIRPVersion request message 106 to Agent 104 for inquiring of the Agent's supported IRP specification version, to which the Agent 104 replies with a getXXXIRPVersion reply message 108 comprising a parameter 110 indicative of a list of elements, each containing the name and the version number the Agent's supported IRP specifications. In current implementation, an element of the parameter 110 consists of three characters, such as for example "1f1".

Reference is now made to FIG. 1.b (Prior Art), which shown a schematic representation of the structure of one element 120 of the parameter 110 returned in the message 108 shown in FIG. 1.a. The element 120 consists of three segments 122, 124 and 126, wherein the first segment 122 refers to the IRP IS version number (which represent the version number of the IRP Information Service), the second segment 124 refers to the type of IRP specification type, and the third segment refers to the IRP SS version number (which represent the version number of the IRP Solution Set). For example, the string "1f1" means that the Agent 104 (shown in FIG. 1.a) implements the IRP IS version number 1 of the ("f", Fault) Alarm IRP specification, IRP SS version number 1.

There are three problems with the above way of handling and transmitting the IRP specification name and version. The first problem is that the IRP specifications evolve through the acceptance by the standard body of multiple technical specification Change Requests (CRs) made by industry players. CRs writers do not always take into account if their proposed changes affect the IRP version number or not. CR writers typically do not suggest to change the constant strings representing the notification categories in the NotificationIRPConstDefs IDL file, an Interface Description Language (IDL). Referring to FIG. 1.a, the notification categories are represented by the parameter 110 comprised in message 108. If the constant strings representing the notification categories are not adequately changed in the NotificationIRPConstDefs IDL file (not shown in FIG. 1.a; information from the IDL file defines the IRP type and version number, and is compiled by the Agent for the generation of the appropriate parameter 110) as and when required by CRs, which oftentimes occurs nowadays, IRP Manager 102 may be given the erroneous IRP version supported by the Agent 104.

The second problem is the lack of clear understanding of the standard body members on how to handle multiple CRs, where some CRs affect backward compatibility while others do not. By not considering that some CRs affect backward compatibility or by processing CRs in the wrong order, the process may end-up by having wrong values for constant strings representing the notification categories, such as the values sent in parameter 110 of FIG. 1.a.

Finally, the third problem is that whenever a version number of any IRP specification is changed, it also requires a new version number for the given Notification IRP specification, since all the constant strings representing the notification categories are defined in a NotificationIRPConstDefs IDL file, which is included in a Notification IRP SS document. Consistent reviews of all IRP specifications impacted by an accepted CR are not always performed by the standard body, which sometimes creates transmission confusion and errors between interconnected nodes implementing signalling based upon the given IRP specification.

Accordingly, it should be readily appreciated that in order to overcome the deficiencies and shortcomings of the existing solutions, it would be advantageous to have a scheme that unequivocally identifies a technical specification (protocol) used by co-operating nodes. The present invention provides such a solution.

SUMMARY OF THE INVENTION

In one aspect, the present invention is a method for transmitting an indication of a communications protocol supported by a first communications node, the method comprising the steps of:
  i) transmitting from a second communications node to the first communications node a request for a protocol supported by the first communications node; and
  ii) responsive to the request, transmitting a reply message comprising a parameter indicative of a Third Generation Partnership Project (3GPP) Technical Specification (TS) document number defining at least a protocol supported by the first communications node.

In another aspect, the present invention is a management system comprising:
  a second node;
  a first node receiving from the second communications node a request for a protocol supported by the first communications node;
  wherein responsive to the request, the first node transmits to the second node a reply message comprising a parameter indicative of a Third Generation Partnership Project (3GPP) Technical Specification (TS) document number defining at least a protocol supported by the first communications node.

In yet another aspect, the present invention is an agent receiving from a manager a request for a protocol supported by the Agent, and responsive to the request, transmitting a reply message comprising a parameter indicative of a Third Generation Partnership Project (3GPP) Technical Specification (TS) document number defining at least a protocol supported by the agent.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1.*a* (Prior Art) is a nodal operation and signal flow diagram of a typical prior art scenario for exchanging Integration Reference Point (IRP) specification names and versions between two communications nodes;

FIG. 1.*b* (Prior Art) is a schematic representation of the structure of an element of the getXXXIRPVersion reply message used in a typical prior art scenario for exchanging IRP specification names and versions between two communications nodes;

FIG. 2.*a* is a nodal operation and signal flow diagram illustrative of the preferred embodiment of the present invention related to the use of the Third Generation Partnership Project (3GPP) document number in communications between cooperating nodes in a network management system; and FIG. 2.*b* is an exemplary flowchart diagram illustrative of the set-up of an exemplary abridged technical specification version number computed according to the preferred embodiment of the present invention.

DETAILED DESCRIPTION OF THE PREFERRED EMBODIMENTS

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

The Third Generation Partnership Project (3GPP) assigns document numbers, such as for example the document number "3GPP TS 32.106-3 v 3.2.0" to each 3GPP technical specification it publishes. IDL files and GDMO (General Definition of Managed Objects) definitions, which represent the protocol interface and the managed object model to support, are part of the 3GPP technical specification having a unique document number. Therefore, the present invention proposes to use the 3GPP document number of each 3GPP technical specification in order to unambiguously identify the IDL files and GDMO definitions used by each node in communications between cooperating nodes of a communications network.

Referring now to FIG. 2.*a*, depicted therein is a nodal operation and signal flow diagram illustrative of the preferred embodiment of the present invention related to the use of the 3GPP document number in communications between cooperating nodes in a network management system. The network management system 200 comprises an Agent 202 in communication with a Manager 204. Prior to exchanging any message, the Manager 204 must know the protocol used and supported by the Agent 202. For example, the Manager 204 may inquire of the supported technical specification (protocol) used by the cooperating Agent 202 (the IDL definition it supports) by sending a GetXXXIRPVersion request message 210 to the Agent 202. Upon receipt of the request message 210, according to the preferred embodiment of the invention, the Agent computes (including retrieving from a memory) an abridged technical specification version number that uniquely identifies the used protocol, action 212, and returns the abridged technical specification version number 214 to the Manager 204 in a GetXXXIRPVersion reply message 216. If the Agent 202 supports multiple versions of the alarm IRP:SS (the Alarm IRP Solution Set), then the Agent includes in the reply message 216 a plurality of abridged version numbers, each of which identifies a specific version of 3GPP Alarm IRP:SS technical specification. In this manner, the Manager 204 is informed of all the Alarm IRP:SS technical specifications supported by the Agent 202. Based on this first exchange, Manager 204 knows exactly which protocol to use to send requests to Agent 202.

Reference is now made to FIG. 2.*b*, which shows an exemplary flowchart diagram illustrative of a set-up of an exemplary abridged technical specification version number that may be computed in step 212 of FIG. 2.*a*. According to the invention, the method starts at 300 with the full name of a 3GPP technical specification, such as for example with "3GPP TS 32.106-3 v3.2.0" 302. At step 304, the method discard the header of the technical specification name, and the name is reduced to the string "32.106-3 v3.2.0" 306. At step 308, the method discards all characters after (and including) the last period, and the string name is further reduced to "32.106-3 v3.2" 310. Finally, at step 312, the method eliminates all white spaces from the remaining string and capitalizes the final string, that becomes the computed abridged technical specification version number "32.106-3V3.2" 214.

Reference is now made back to FIG. 2.*a*, which further shows another use of the abridged technical specification version number according to the preferred embodiment of the invention. The Manager 204 transmits a GetNotificationCategory request message 220 for inquiring of the technical specification version of the alarm notifications sent by the Agent 202. The Agent 202 receives the request 220, and computes the abridged technical specification version number in the manner already described with relation to FIG. 2.*b*. Then the Agent 202 returns the abridged technical specification version number 214 to the Manager 204 in a GetNotificationCategory reply message 222. Following message 222, all the alarm notifications 224 and 226 sent by the Agent 202 to Manager 204 comprise the abridged technical specification version number 214 in their header so that Manager 204 knows exactly the format of the notification it receives from Agent 202.

FIG. 2.*a* further shows yet another use of the abridged technical specification version number according to the preferred embodiment of the invention. The Manager 204 may transmit a GetNetworkResourceSchemaID request message 240 for inquiring of the set of Managed Object Classes (e.g. Generic NRM, UTRAN NRM) of the network resource schema identification. The set of Managed Object Classes of the network resource schema identification defines all the Managed Object classes and their attributes. The Agent 202 computes the technical specification version number of the supported technical specification, as previously described with relation to FIG. 2.*a*. For example, if the Agent 202 supports one particular version of the Generic NRM and one particular version of the UTRAN (UMTS Terrestrial Radio Access Network) NRM, the getNetworkResourceSchemaId( ) reply message 242 to the getNetworkResourceSchemaId( ) request message 240 may contain two abridged version numbers 214$_1$ and 214$_2$, each of which identifies a specific 3GPP specification. If the Agent 202 supports two particular versions, one of which is backward compatible to the other, of the Generic NRM, the getNetworkResourceSchemaId( ) reply message 242 also contains two abridged version numbers, each of which identifies a specific supported version of the 3GPP specification.

Based upon the foregoing, it should now be apparent to those of ordinary skill in the art that the present invention provides an advantageous solution, which offers unambiguous identification of the appropriate technical specification (protocol) used by cooperating nodes. Therefore, the invention simplifies the handling of the standard change request process, eliminates the need to update constant strings in IDL file(s), and allows for unambiguous identification of the protocol used by cooperating nodes. It should be realized upon reference hereto that the innovative teachings contained herein are not necessarily limited to the disclosed examples. For example, although the invention has been described with reference to communications between an agent and a manager of a management system, it is understood that the invention is also applicable to any kind of networks and network nodes. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for transmitting an indication of a communications protocol supported by a first communications node, the method comprising the steps of:
   i) transmitting from a second communications node to the first communications node a request for a protocol supported by the first communications node;
   ii) issuing a parameter indicative of the protocol supported by the first communications node by abridging a Third Generation Partnership Project (3GPP) Technical Specification (TS) document number defining at least a protocol supported by the first communications node; and
   iii) responsive to the request, transmitting a reply message comprising the parameter indicative of the 3GPP TS document number defining the at least one protocol supported by the first communications node.

2. The method claimed in claim 1, wherein step ii) comprises the step of:
   discarding a header of the 3GPP TS document number;
   discarding all characters following and including a last period of the 3GPP TS document number; and
   discarding all spaces of the 3GPP TS document number and capitalizing the 3GPP TS document number.

3. The method claimed in claim 1, wherein the first communications node is a system management agent, and the second communications node is a system management manager of a management system.

4. The method claimed in claim 1, wherein the request for a protocol supported by the first communications node is a getXXXIRPVersion request message and the reply message is a getXXXIRPVersion reply message comprising the parameter indicative of at least one 3GPP TS document number identifying at least one XXX IRP Version supported by the first communications node.

5. The method claimed in claim 4, wherein the getXXXIRPVersion request message is a getAlarmIRPVersion request and the getXXXIRPVersion reply message is a getAlarmIRPVersion reply message comprising the parameter indicative of the at least one 3GPP TS document number identifying at least one Alarm IRP Version supported by the first communications node.

6. The method claimed in claim 1, wherein the request for a protocol supported by the first communications node is a getNotificationCategory request message and the reply message is a getNotificationCategory reply message comprising the parameter indicative of at least one 3GPP TS document number identifying at least one notification category supported by the first communications node.

7. The method claimed in claim 6, wherein the method further comprises the step of:
   following the receipt of the getNotificationCategory reply message by the Manager, transmitting from the Agent to the Manager at least one Alarm Notification message comprising the parameter indicative of the 3GPP TS document number.

8. The method claimed in claim 1, wherein the request for a protocol supported by the first communications node is a getNetworkResourceSchemaId request message and the reply message is a getNetworkResourceSchemaId reply message comprising the parameter indicative of at least one 3GPP TS document number identifying at least one network resource schema identification (ID) supported by the first communications node.

9. The method claimed in claim 1, wherein the parameter is indicative of a plurality of 3GPP TS document numbers identifying a plurality of protocols supported by the first communications node.

10. A management system comprising:
a second node;
a first node receiving from the second communications node a request for a protocol supported by the first communications node;
wherein the first communications node issues a parameter indicative of one or more protocols it supports by abridging at least one Third Generation Partnership Project (3GPP) Technical Specifications (TS) document number defining at least a protocol supported by the first communications node and, responsive to the request, the first node transmits to the second node a reply message comprising a the paragraph indicative of the 3GPP TS document number defining the at least one protocol supported by the first communications node.

11. The management system claimed in claim 10, wherein the first node computes the abridged 3GPP TS document version number by:
discarding a header of the 3GPP TS document number;
discarding all characters following and including a last period of the 3GPP TS document number; and
discarding all spaces of the 3GPP TS document number and capitalizing the 3GPP TS document number.

12. The management system claimed in claim 10, wherein the first communications node is a system management agent, and the second communications node is a system management manager of a management system.

13. The management system claimed in claim 10, wherein the request for a protocol supported by the first communications node is a getXXXIRPVersion request message and the reply message is a getXXXIRPVersion reply message comprising the parameter indicative of at least one 3GPP TS document number identifying at least one XXX IRP Version supported by the first communications node.

14. The management system claimed in claim 13, wherein the getXXXIRPVersion request message is a getAlarmIRPVersion request and the getXXXIRPVersion reply message is a getAlarmIRPVersion reply message comprising the parameter indicative of the at least one 3GPP TS document numbers identifying at least one Alarm IRP Version supported by the first communications node.

15. The management system claimed in claim 10, wherein the request for a protocol supported by the first communications node is a getNotificationCategory request message and the reply message is a getNotificationCategory reply message comprising the parameter indicative of at least one 3GPP TS document number identifying at least one notification category supported by the first communications node.

16. The management system claimed in claim 15, wherein following the receipt of the getNotificationCategory reply message by the Manager, the Agent transmits to the Manager at least one Alarm Notification message comprising the parameter indicative of the 3GPP TS document number.

17. The management system claimed in claim 10, wherein the request for a protocol supported by the first communications node is a getNetworkResourceSchemaId request message and the reply message is a getNetworkResourceSchemaId reply message comprising the parameter indicative of at least one 3GPP TS document number identifying at least one network resource schema identification (ID) supported by the first communications node.

18. The management system claimed in claim 10, wherein the parameter is indicative of a plurality of 3GPP TS document numbers identifying a plurality of protocols supported by the first communications node.

19. An agent receiving from a manager a request for a protocol supported by the Agent, the agent issuing a parameter indicative of one or more protocols it supports by abridging at least one Third Generation Partnership Project (3GPP) Technical Specifications (TS) document number defining at least a protocol supported by the first communications node and, responsive to the request, transmits to the second communications node a reply message comprising the parameter indicative of the 3GPP document number defining the at least one protocol supported by the agent.

20. The agent claimed in claim 19, wherein the agent computes the abridged the 3GPP TS document number by:
discarding a header of the 3GPP TS document number;
discarding all characters following and including a last period of the 3GPP TS document number; and
discarding all spaces of the 3GPP TS document number and capitalizing the 3GPP TS document number.

21. The agent claimed in claim 19, wherein the request for a protocol supported by the agent is a getXXXIRPVersion request message and the reply message is a getXXXIRPVersion reply message comprising the parameter indicative of at least one 3GPP TS document number identifying at least one XXX IRP Versions supported by the agent.

22. The agent claimed in claim 21, wherein the getXXX-IRPVersion request message is a getAlarmIRPVersion request and the getXXXIRPVersion reply message is a getAlarmIRPVersion reply message comprising the parameter indicative of the at least one 3GPP TS document number identifying at least one Alarm IRP Version supported by the agent.

23. The agent claimed in claim 19, wherein the request for a protocol supported by the agent is a getNotificationCategory request message and the reply message is a getNotificationCategory reply message comprising the parameter indicative of at least one 3GPP TS document number identifying at least one notification category supported by the agent.

24. The agent claimed in claim 23, wherein following the receipt of the getNotificationCategory reply message by the Manager, the agent transmits to the Manager at least one Alarm Notification message comprising the parameter indicative of the 3GPP TS document number.

25. The agent claimed in claim 19, wherein the request for a protocol supported by the agent is a getNetworkResourceSchemaId request message and the reply message is a getNetworkResourceSchemaId reply message comprising the parameter indicative of at least one 3GPP TS document number identifying at least one network resource schema identification (ID) supported by the agent.

26. The agent claimed in claim 19, wherein the parameter is indicative of a plurality of 3GPP TS document numbers identifying a plurality of protocols supported by the agent.

* * * * *

UNITED STATES PATENT AND TRADEMARK OFFICE
CERTIFICATE OF CORRECTION

| | | |
|---|---|---|
| PATENT NO. | : 7,065,053 B2 | Page 1 of 1 |
| APPLICATION NO. | : 10/024234 | |
| DATED | : June 20, 2006 | |
| INVENTOR(S) | : Godin et al. | |

It is certified that error appears in the above-identified patent and that said Letters Patent is hereby corrected as shown below:

Title Page;
On the Face Page, in Field (56), under "U.S. PATENT DOCUMENTS", in Column 2, Line 1, delete "6,678,361 B1" and insert -- 6,678,361 B2 --, therefor.

On the Face Page, in Field (56), under "U.S. PATENT DOCUMENTS", in Column 2, Line 2, delete "6,934,756 B1" and insert -- 6,934,756 B2 --, therefor.

On the Face Page, in Field (56), under "U.S. PATENT DOCUMENTS", in Column 2, Line 3, delete "6,952,181 B1" and insert -- 6,952,181 B2 --, therefor.

On the Face Page, in Field (57), under "ABSTRACT", in Column 2, Line 9, delete "SchemeId" and insert -- SchemaId --, therefor.

In Figure 2.a, Sheet 2 of 3, for Tag "212" delete "Abdridged" and insert -- Abridged --, therefor in all three occurrences.

In Column 7, Line 27, in Claim 10, delete "a the paragraph" and insert -- the parameter --, therefor.

Signed and Sealed this

Sixteenth Day of March, 2010

David J. Kappos
*Director of the United States Patent and Trademark Office*